United States Patent
Meissner et al.

(10) Patent No.: US 12,429,591 B2
(45) Date of Patent: Sep. 30, 2025

(54) METHOD FOR TRACKING A RETROREFLECTOR AND DEVICE FOR CARRYING OUT SUCH A METHOD

(71) Applicant: DR. JOHANNES HEIDENHAIN GmbH, Traunreut (DE)

(72) Inventors: Markus Meissner, Uebersee (DE); Alexander Schwanecke, Traunreut (DE); Nikolas Tekles, Pittenhart (DE); Franz Langrieger, Trostberg (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 305 days.

(21) Appl. No.: 18/159,146

(22) Filed: Jan. 25, 2023

(65) Prior Publication Data
US 2023/0251380 A1    Aug. 10, 2023

(30) Foreign Application Priority Data
Feb. 8, 2022    (DE) .................. 102022201293.3

(51) Int. Cl.
G01S 17/66    (2006.01)
G01B 11/00    (2006.01)

(52) U.S. Cl.
CPC ............ G01S 17/66 (2013.01); G01B 11/005 (2013.01)

(58) Field of Classification Search
CPC ..... G01B 11/005; G01C 15/002; G01S 17/66; G01S 7/4812
See application file for complete search history.

(56) References Cited

U.S. PATENT DOCUMENTS

| | | | |
|---|---|---|---|
| 8,330,942 B2 | 12/2012 | Nordenfelt et al. | |
| 2010/0149518 A1* | 6/2010 | Nordenfelt | G01C 15/002 356/138 |
| 2010/0208232 A1 | 8/2010 | Hara | |
| 2012/0120415 A1* | 5/2012 | Steffensen | G06F 3/017 356/614 |
| 2018/0259328 A1 | 9/2018 | Setchell et al. | |

FOREIGN PATENT DOCUMENTS

EP    2118682 B1    8/2011

* cited by examiner

*Primary Examiner* — Peter B Kim
(74) *Attorney, Agent, or Firm* — LEYDIG, VOIT & MAYER, LTD.

(57) ABSTRACT

A method for tracking a retroreflector that is movable in space includes emitting a measurement light beam toward the retroreflector. A tracking control signal is generated as a function of the position of the measurement light beam reflected by the retroreflector on a detector. A status determination is continuously made as to whether the measurement light beam is steerable to follow the retroreflector or whether the retroreflector has been lost. In a search mode based on it having been determined that the retroreflector has been lost, a trajectory estimation is performed based on measurement values to determine an estimated trajectory. A search pattern adapted to the estimated trajectory is created, and the measurement light beam is then moved along a corresponding search path using tracking control signals derived from the estimated trajectory and the search pattern. The search mode is terminated upon a tracking control signal being generatable again.

11 Claims, 8 Drawing Sheets

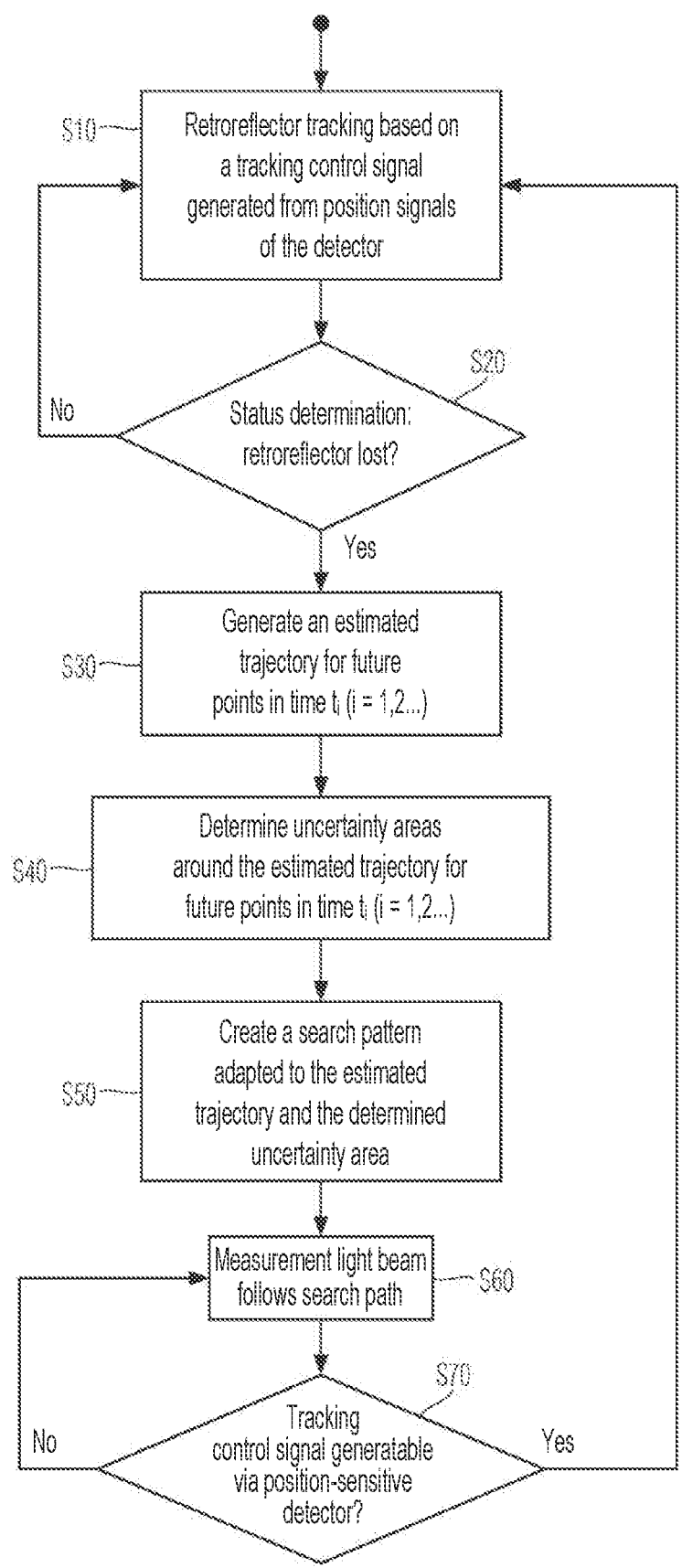

METHOD FOR TRACKING A RETROREFLECTOR AND DEVICE FOR CARRYING OUT SUCH A METHOD

CROSS REFERENCE TO RELATED APPLICATION

This application claims benefit to German Patent Application No. DE 10 2022 201 293.3, filed on Feb. 8, 2022, which is hereby incorporated by reference herein.

FIELD

The present invention relates to a method for tracking a retroreflector that is movable in space and to a device for carrying out such a method.

BACKGROUND

It has been known for quite some time that three-dimensional coordinates in space can be determined using laser trackers. Laser trackers are employed, for example, in the measurement of large components or to calibrate machine tools. Such lasers typically include an interferometer for high-precision measurement of the distance to a retroreflector that is movable in space and attached to the measurement object. The measurement light beam emitted by the light source of the interferometer is steered by a tracking actuator mechanism in an automated manner to follow the retroreflector, which reflects the measurement light beam back in a direction opposite to the incident direction. In order to track or follow the retroreflector in an automated manner, a portion of the retro-reflected measurement light beam is coupled out by a beam splitter and directed to a position-sensitive detector. Depending on the position of the incident measurement light beam on the detector, a signal processor generates a tracking control signal which is used by the tracking actuator mechanism to steer the measurement light beam to follow the retroreflector. If the measurement light beam between the retroreflector and the detector is temporarily interrupted, then the tracking control signal can no longer be generated and the retroreflector can no longer be tracked. In such a case, one also speaks of a "loss" of the retroreflector. Such interruption of the beam may be caused, for example, by an obstacle in the beam path of the measurement light beam. In order to resume measurement after the beam interruption, it is necessary to retrieve the retroreflector as quickly as possible; i.e., the beam interruption should be as short as possible.

One approach to solving this problem is described, for example, in EP 2 118 682 B1, which proposes to create, based on continuous measurements, a model for the trajectory of the target or the distance to the target, and to use the created model to estimate the current position of the target. If the target is lost during measurement, the estimated position is used to search the target. This approach has the disadvantage that in the event of a possibly prolonged interruption of the beam, the actual position of the retroreflector may deviate significantly from the estimated position, and that the retroreflector can therefore not be reliably retrieved.

SUMMARY

In an embodiment, the present invention provides a method for tracking a retroreflector that is movable in space. A light source emits a measurement light beam toward the retroreflector, which reflects the measurement light beam back in a direction opposite to an incident direction, wherein at least a portion of the measurement light beam that was reflected is incident at a position on a position-sensitive detector. A signal processor generates a tracking control signal as a function of the position of the measurement light beam on the position-sensitive detector, the tracking control signal being used by a tracking actuator mechanism to steer the measurement light beam to follow the retroreflector. The signal processor continuously makes a status determination as to whether the measurement light beam is steerable by the tracking actuator mechanism to follow the retroreflector or whether the retroreflector has been lost. In a search mode based on it having been determined that the retroreflector has been lost, a trajectory estimation is performed based on measurement values from the tracking actuator mechanism in order to determine an estimated trajectory of the retroreflector for future points in time. Search areas around the estimated trajectory are determined for the future points in time. A search pattern adapted to the estimated trajectory and the determined search areas is created, and the measurement light beam is then moved along a corresponding search path with aid of the tracking actuator mechanism using tracking control signals derived from the estimated trajectory and the created search pattern. The search mode is terminated upon a tracking control signal being generatable by the position-sensitive detector again.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 8 is a flow chart illustrating the basic procedure used within the scope of the method according to an exemplary embodiment of the invention.

DETAILED DESCRIPTION

Figure 1A:
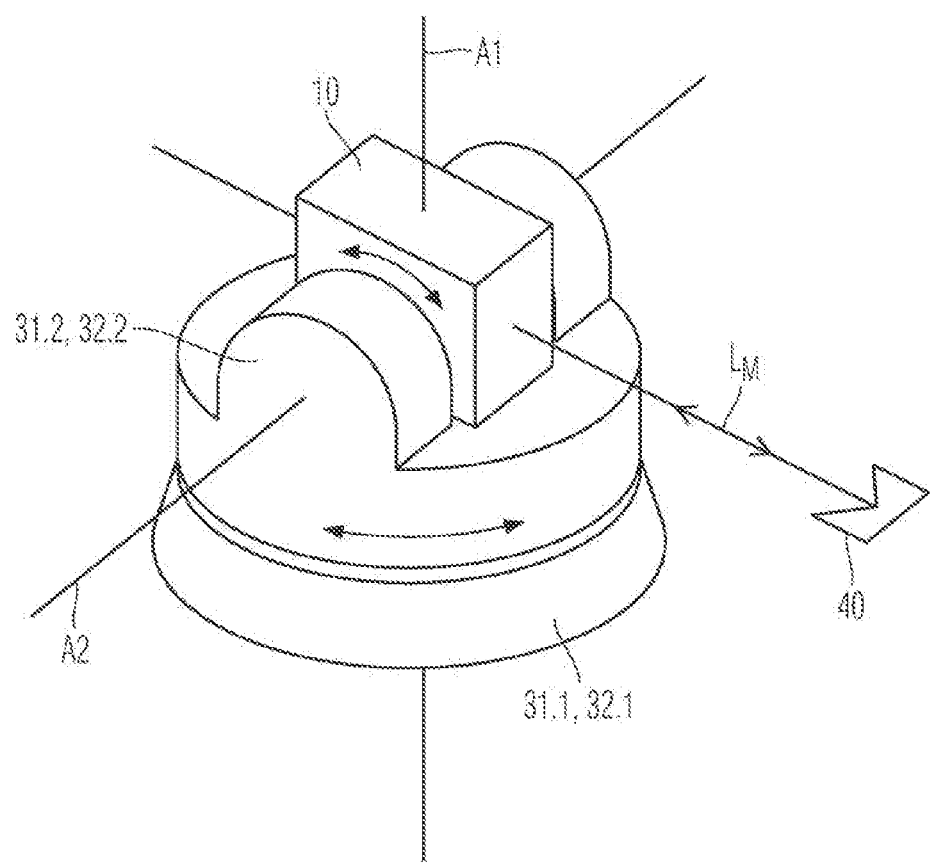
FIG. 1a is a partial view of an exemplary embodiment of the device according to the invention.

Embodiments of the present invention provide a method and a device for tracking a retroreflector that is movable in space, which method and device ensure that the retroreflector can be quickly and reliably retrieved in the event of a beam interruption.

The inventive method is used for tracking a retroreflector that is movable in space. For this purpose, a light source emits a measurement light beam toward the retroreflector, which reflects it back in a direction opposite to the incident direction. At least a portion of the retro-reflected measurement light beam is incident on a position-sensitive detector. A signal processor generates a tracking control signal as a function of the position of the measurement light beam on the detector, the tracking control signal being used by a tracking actuator mechanism to steer the measurement light beam to follow the retroreflector. The signal processor continuously makes a status determination as to whether the measurement light beam can be steered by the tracking actuator mechanism to follow the retroreflector or whether the retroreflector has been lost. If it is determined that the retroreflector has been lost, then, in a search mode, a trajectory estimation is performed based on measurement values of the tracking actuator mechanism in order to determine an estimated trajectory of the retroreflector for future points in time. Furthermore, search areas around the estimated trajectory are determined for future points in time, and a search pattern adapted to the estimated trajectory and the determined search area is created. The measurement light beam is then moved along a corresponding search path with the aid of the tracking actuator mechanism using tracking control signals, the tracking control signals being derived from the estimated trajectory and the determined search pattern. The search mode is terminated as soon as a tracking control signal can be generated via the position-sensitive detector again.

Preferably, the spatial search area around the estimated trajectory of the retroreflector is increased as the search proceeds.

It is possible that the measurement light beam may be repeatedly moved along a spiral search pattern from a center of the search area to a boundary of the search area and back again.

The measurement light beam may be moved back and forth between opposite boundaries of the search area along a serpentine search pattern in an oscillating manner about a predetermined direction.

It may also be provided that the measurement light beam be initially moved for a predetermined period of time at a first speed along the estimated trajectory of the retroreflector, and that after the predetermined period of time has elapsed, the measurement light beam be moved in an oscillating manner about the estimated trajectory at a second speed that is greater than the first speed, the oscillation amplitude increasing as the search proceeds.

Preferably, the trajectory estimation is performed with the aid of a Kalman filter which extrapolates the actual trajectory traveled until the retroreflector was lost.

For this purpose, at least measured angle values of the tracking actuator mechanism may be used as measurement values for the trajectory estimation, the measured angle values being derived from the rotation of the measurement light beam about two orthogonal axes of rotation of the tracking actuator mechanism.

It is also possible that the Kalman filter may determine the search area around the estimated trajectory for a plurality of points in time during the search.

Moreover, it may be provided that, for the purpose of status determination, the intensity of the measurement light beam incident on the detector be determined and compared to at least one predetermined intensity threshold, and that the status be determined as a function of the comparison result.

The inventive device is used for tracking a retroreflector that is movable in space. A light source provided emits a measurement light beam toward the retroreflector, which reflects it back in a direction opposite to the incident direction. At least a portion of the retro-reflected measurement light beam is incident on a position-sensitive detector.

An also provided signal processor according to an embodiment of the invention is configured and adapted to:

generate a tracking control signal as a function of the position of the measurement light beam on the detector, the tracking control signal being usable by a tracking actuator mechanism to steer the measurement light beam to follow the retroreflector, and continuously make a status determination as to whether the measurement light beam can be steered by the tracking actuator mechanism to follow the retroreflector or whether the retroreflector has been lost, and if it is determined that the retroreflector has been lost, perform, in a search mode, a trajectory estimation based on measurement values of the tracking actuator mechanism in order to determine an estimated trajectory of the retroreflector for future points in time, and determine search areas around the estimated trajectory for future points in time, and create a search pattern adapted to the estimated trajectory and the determined search area, and then move the measurement light beam along a corresponding search path with the aid of the tracking actuator mechanism using tracking control signals, the tracking control signals being derived from the estimated trajectory and the determined search pattern, and the search mode being terminated as soon as a tracking control signal can be generated via the position-sensitive detector again.

Advantageously, the signal processor is further configured and adapted to increase the spatial search area around the estimated trajectory as the search proceeds.

It is possible that the tracking actuator mechanism may include two drives which enable rotation of the measurement light beam about two orthogonal axes of rotation, and that each axis of rotation may be associated with an angle-measuring device whose measured angle values are used by the signal processor for the trajectory estimation.

It may further be provided that the position-sensitive detector be configured as a four-quadrant diode or as a position-sensitive diode.

Furthermore, the inventive device according to an embodiment of the invention may have an optical assembly including at least two beam splitters, a reference reflector, a distance-measurement detection unit, as well as the position-sensitive detector, the optical assembly being capable of receiving a light beam emitted by the light source, so that in the optical assembly, the received light beam strikes a first beam splitter, which splits the light beam incident thereon into the measurement light beam and a reference light beam, and the measurement light beam propagates toward the retroreflector, and the reference light beam propagates toward the reference reflector, and the reference light beam reflected back from the reference reflector strikes the first beam splitter again, and the measurement light beam reflected back from the retroreflector strikes a second beam splitter via which a portion of the measurement light beam is coupled out to the position-sensitive detector and the remaining portion of the retro-reflected measurement light beam strikes the first beam splitter again, where it is superimposed on the reference light beam, and the superimposed measurement and reference light beam propagates toward the distance-measurement detection unit.

It should be mentioned that the measures according to embodiments of the invention provide the significant advantage of ensuring that the retroreflector can be reliably retrieved, even in the event of a possibly prolonged interruption of the beam. This is substantially achieved by the search process accounting for the fact that the uncertainty in the estimation of the retroreflector trajectory increases with the duration of the beam interruption. In this way, the probability of fast retrieval of the retroreflector can be significantly increased. Generally, no additional components are required for this, and the respective measurement application does not need to be completely interrupted or possibly reset.

Figure 1B:
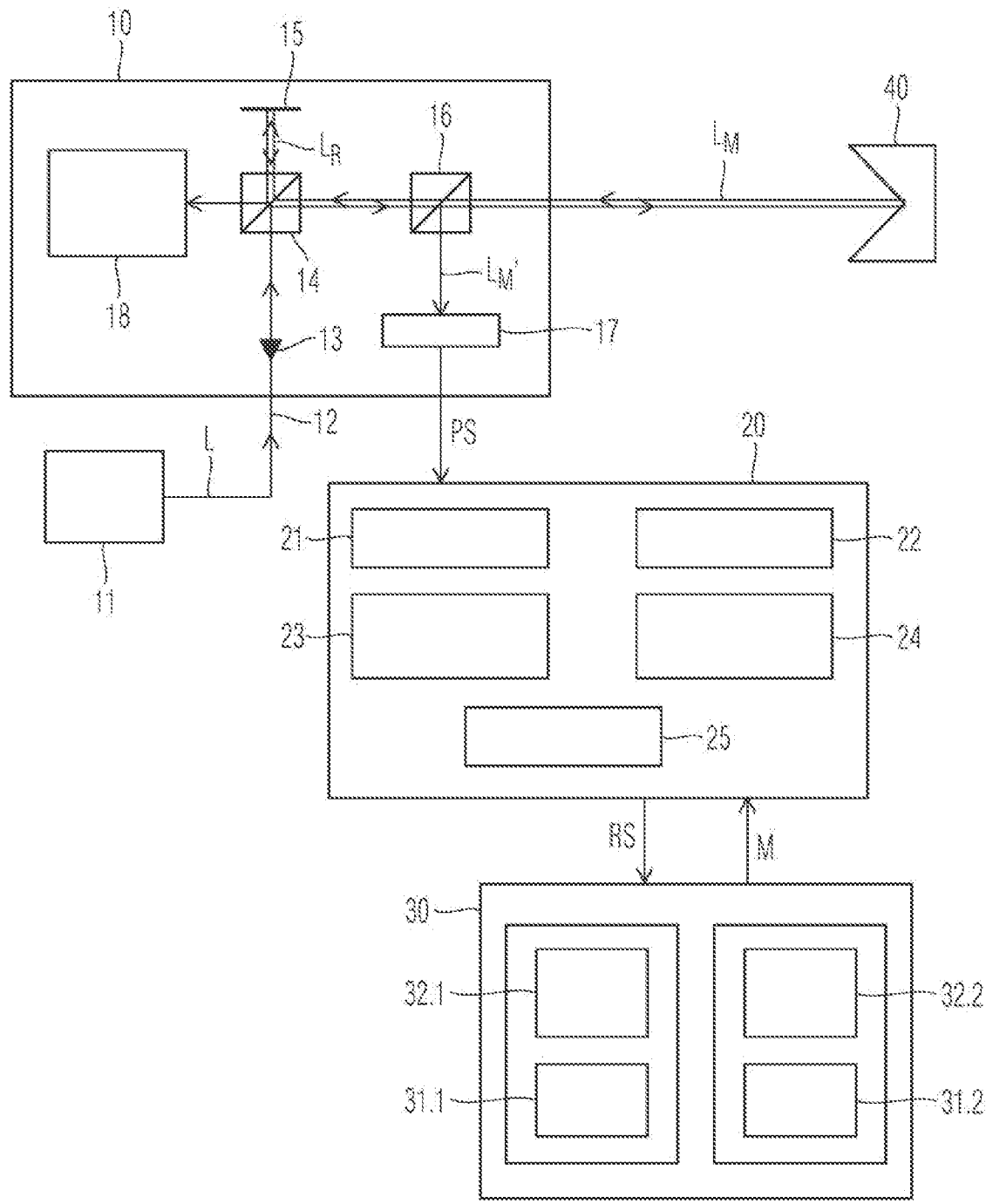
FIG. 1b is a highly schematic block diagram showing different functional components of the device according to an exemplary embodiment of the invention.

An exemplary embodiment of the device according to the invention will be described below with reference to FIGS. 1a and 1b, where FIG. 1a shows a portion of the respective device, and FIG. 1B shows a highly schematic block diagram depicting a number of functional components of this device.

The device illustrated in the figures serves to determine the spatial position of a retroreflector 40 that is movable in space and which is tracked using this device. To this end, a plurality of distance measurements are made between a reference point and the retroreflector. The spatial position of retroreflector 40 can then be determined from these distance measurements using known methods. Retroreflector 40 is disposed, for example, on a moving component of a machine tool which is to be calibrated with the aid of the device according to an embodiment of the invention. In the present exemplary embodiment, an interferometric measurement method is used for distance measurement.

With the aid of a tracking actuator mechanism 30, a measurement light beam $L_M$ emitted from a light source 11 through an optical assembly 10 is steered to follow retroreflector 40 and centered to the extent possible on retroreflector 40. For this purpose, in the present exemplary embodiment, tracking actuator mechanism 30 includes two drives 31.1, 31.2 which enable pivoting of the measurement light beam $L_M$ about two orthogonal axes of rotation A1, A2, which are also referred to as azimuth axis (A1) and elevation axis (A2) of the respective device. Tracking actuator mechanism 30 further includes two angle-measuring devices 32.1, 32.2 associated with the two drives 31.1, 31.2 and capable of measuring the rotational movements of measurement light beam $L_M$ about the two axes of rotation A1, A2. Thus, the two angle-measuring devices 32.1, 32.2 each produce measurement values MW in the form of measured angle values which characterize the rotation of measurement light beam $L_M$ about the two axes of rotation A1, A2.

The interferometer used here for distance measurement includes, on the one hand, a measuring arm configured along the steered measurement light beam $L_M$ between a first beam splitter 14 and the movable retroreflector 40. On the other hand, a reference arm of the interferometer is configured in optical assembly 10 along a reference light beam $L_R$ between first beam splitter 14 and a stationary reference reflector 15. Accordingly, first beam splitter 14 splits the light beam L emitted by light source 11 (e.g., a suitable laser) and received via an optical waveguide 12 and a fiber collimator 13 into a measurement light beam $L_M$ and a reference light beam $L_R$. The respective light beams $L_M$ and $L_R$ are reflected by the movable retroreflector 40 in the measuring arm and the stationary reference reflector 15 in the reference arm, respectively, each in a direction opposite to the incident direction. During this process, measurement light beam $L_M$ first passes through a second beam splitter 16 in optical assembly 10, a portion of measurement light beam $L_M'$ being coupled out by second beam splitter 16 to a position-sensitive detector 17. The remaining portion of measurement light beam $L_M$ that is not coupled out, just as the retro-reflected reference light beam $L_R$, then strikes first beam splitter 14 again, where the two light beams $L_M$, $L_R$ are superimposed on one another. Then, an interfering pair of light beams $L_M$, $L_R$ propagates from first beam splitter 14 toward a distance measurement detection unit 18. From the interference signal thereby detected, distance information regarding retroreflector 40 can be derived in a known manner. The interferometric distance measurement method used in the illustrated device is not essential to the invention. A wide range of known relative or absolute distance measurement methods may be used for this purpose.

In the inventive device, corner reflectors, glass tetrahedal prisms, or spheres with a refractive index of n=2 serve as the retroreflector 40. Stationary reference reflector 15 may be configured identically thereto.

As mentioned earlier, in order to track retroreflector 40, which is movable in space, a portion of the measurement light beam $L_M$ that is reflected back from retroreflector 40 is coupled out at second beam splitter 16 and, as shown in FIG. 1B, impinges as a measurement light beam $L_M'$ on the receiving surface of the downstream position-sensitive detector 17, which may be configured, for example, as a four-quadrant diode or as a position-sensitive diode (PSD).

Position-sensitive detector 17 is connected to a signal-processing unit 20, which generates a tracking control signal RS as a function of the position of measurement light beam $L_M'$ on detector 17. Tracking actuator mechanism 30 uses tracking control signal RS to steer measurement light beam $L_M$ to follow retroreflector 40, which is movable in space. To this end, a signal acquisition unit 21, to which the position signals PS generated by detector 17 are supplied, checks whether the coupled-out measurement light beam $L_M'$ strikes detector 17 at its center or at an offset from its center, as the case may be. If there is an offset, a control unit 23 generates the offset-dependent tracking control signal RS for the tracking actuator mechanism 30 to correspondingly control the drives 31.1, 31.2 and steer measurement light beam $L_M$ to follow retroreflector 40 such that the coupled-out measurement light beam $L_M'$ is incident, to the extent possible, on the center of detector 17 again. For the sake of simplicity, the present description speaks of a tracking control signal RS. In practice, of course, control unit 23 generates separate tracking control signals for the two drives 31.1, 31.2 of tracking actuator mechanism 30, by which measurement light beam $L_M$ is pivoted in space so as to follow retroreflector 40. This means that the term "tracking control signal RS" is, of course, understood to include a plurality of such signals that may be supplied to tracking actuator mechanism 30.

During the measurement mode, signal-processing unit 20 or the status detection unit 22 associated therewith continuously makes a check or status determination as to whether the measurement light beam $L_M$ of the measuring arm can be steered by tracking actuator mechanism 30 to follow retroreflector 40 or whether retroreflector 40 may have been lost. The latter may occur when the beam is interrupted, as mentioned above, and thus the line of sight between optical assembly 10 and retroreflector 40 is interrupted, for example, by an obstacle in the beam path, for a prolonged period of time while, at the same time, retroreflector 40 continues to move in space. In the present exemplary embodiment, for status determination purposes, it is provided that the intensity of the measurement light beam $L_M'$ incident on detector 17 be continuously measured and compared to a predetermined intensity threshold. Status detection unit 22 determines the status as a function of the comparison result. If the intensity is below the intensity threshold, retroreflector 40 is considered to be lost due to a beam interruption, because it is then no longer possible to generate a tracking control signal RS based on a detected offset of the measurement light beam $L_M$ incident on detector 17. Then, in a search mode, the search for retroreflector 40 must be initiated in the manner that will be described in detail hereinafter.

In the device and method according to embodiments of the invention, the status determination as to a possible loss of retroreflector 40 does not necessarily have to be made by means of position-sensitive detector 17. To this end, status detection unit 22 could alternatively use the intensity of the signal generated by distance measurement detection unit 18 and compare it to a suitable intensity threshold.

If the described procedure establishes that retroreflector 40 has been lost, then, in a search mode, further steering of measurement light beam $L_M$ and the search for retroreflector 40 are performed based on a trajectory estimation. This means that the positions of the retroreflector during the beam interruption are estimated, and that the positions along an estimated trajectory $T_{est}$ are used for the required search for retroreflector 40. To this end, trajectory estimation unit 24 uses measurement values MW of tracking actuator mechanism 30, in particular measured angle values of angle-measuring devices 32.1, 32.2, which characterize the rotational movements of measurement light beam $L_M$ about the two axes of rotation A1, A2. The respective measurement values MW used for the trajectory estimation are from a period of time in which measurement light beam $L_M$ could still be steered in the above-described manner in the measurement mode. Accordingly, for this purpose, measurement values MW of the angle-measuring devices 32.1, 32.2 of tracking actuator mechanism 30 are used which were generated in the measurement mode until the beam interruption occurred; i.e., until retroreflector 40 was lost. Details of the trajectory estimation will be described in greater detail in the course of the following description.

In the search mode, control unit 23 finally generates tracking control signals RS for tracking actuator mechanism 30 based on the trajectory estimation in order to move measurement light beam $L_M$ in a certain spatial search area $S_i$ (i=1, 2, . . . ) along the estimated trajectory $T_{est}$ of retroreflector 40 during the beam interruption. As will be explained in the following, search area $S_i$ (i=1, 2, . . . ) changes in the course of the search; i.e., there are different search areas $S_i$ (i=1, 2, . . . ) for different points in time $t_i$ (i=1, 2, . . . ) during the search. Thus, during the search, measurement light beam $L_M$ does not precisely follow the estimated trajectory $T_{est}$, but scans a larger spatial area around the estimated trajectory $T_{est}$ within a designated search area $S_i$ (i=1, 2, . . . ). Thus, during the search for the lost retroreflector 40, the direction of the measurement light beam $L_M$ emitted by optical assembly 10 deviates in a controlled manner from the estimated trajectory $T_{est}$. The search area $S_i$ (i=1, 2, . . . ) swept by measurement light beam $L_M$ corresponds to a certain uncertainty area around the estimated trajectory $T_{est}$ of retroreflector 40, in which the lost retroreflector 40 could be. The respective uncertainty area or search area $S_i$ (i=1, 2, . . . ), just as the estimated trajectory $T_{est}$, is determined by trajectory estimation unit 24 for a plurality of points in time $t_i$ (i=1, 2, . . . ) during the search. Typically, such an uncertainty area has the geometric shape of an ellipse, which is why one speaks of an uncertainty ellipse hereinafter in this connection.

During the search, measurement light beam $L_M$ moves along a predefined search pattern SM around estimated trajectory $T_{est}$ within the uncertainty area or search area $S_i$ (i=1, 2, . . . ). In principle, it may also be provided in this connection that a respective search area $S_i$ (i=1, 2, . . . ) be scanned multiple times. This procedure makes it possible to increase, to the extent possible, the probability of fast retrieval of the retroreflector. With regard to suitable search routines and search patterns SM, which are generated by a search pattern generation unit 25, reference is made to the following description of exemplary embodiments.

In the context of an embodiment of the present invention, it is advantageous if the spatial search area $S_i$ (i=1, 2, . . . ) around the estimated trajectory $T_{est}$ of retroreflector 40 is increased as the search proceeds. This accounts for the fact that retroreflector 40 may increasingly deviate from the estimated trajectory $T_{est}$ as the search proceeds. Increasing the spatial search area $S_i$ (i=1, 2, . . . ) is based on the idea that, initially, the movement of retroreflector 40 can deviate from estimated trajectory $T_{est}$ only within a small range that cannot be of any desired size. However, the longer the beam interruption lasts, the greater the extent to which the position of retroreflector 40 may deviate from the estimated trajectory $T_{est}$ due to changes in speed and acceleration.

Figure 2:
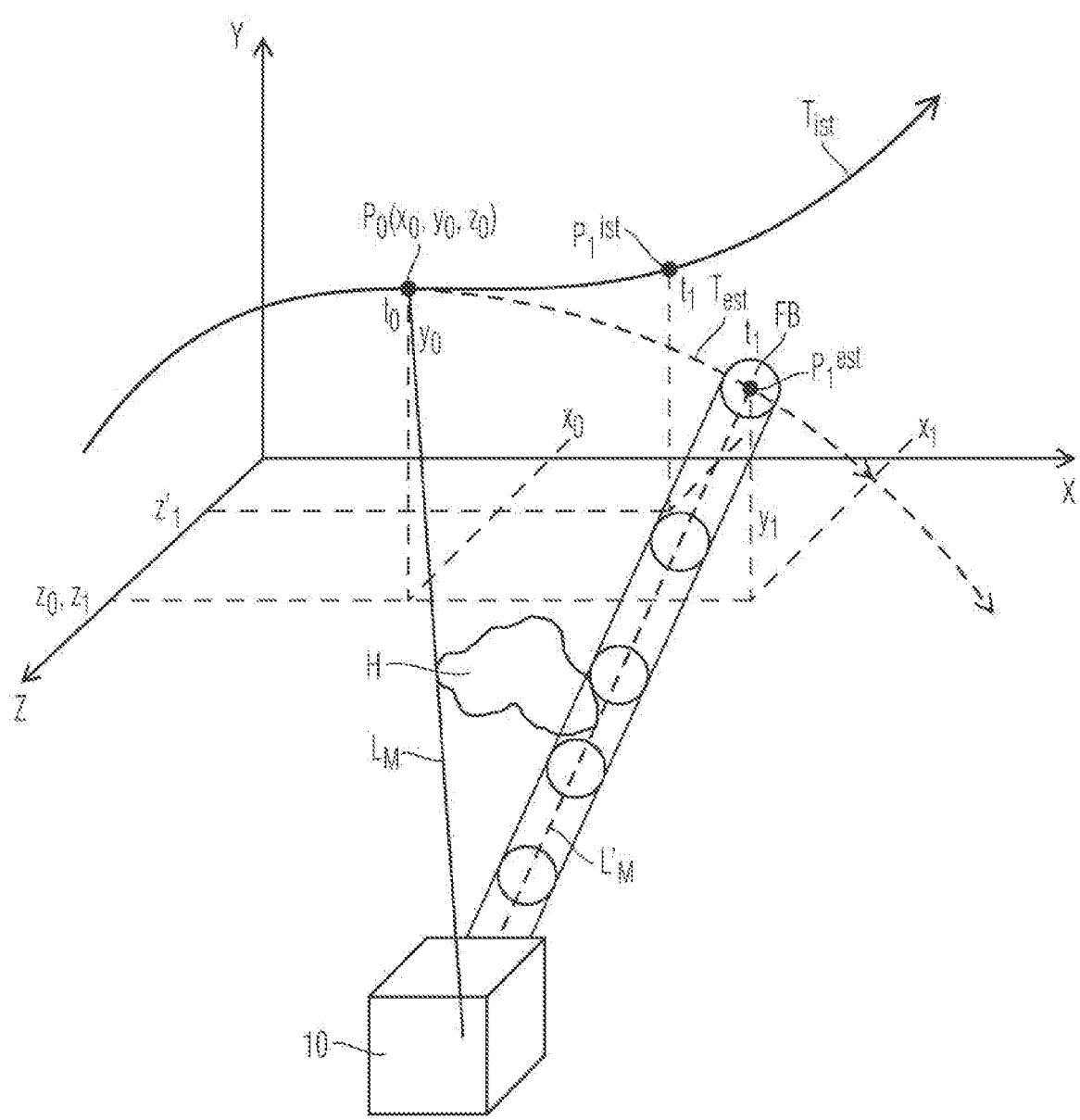
FIG. 2 is a schematic view illustrating a possible beam interruption.
Figure 3:
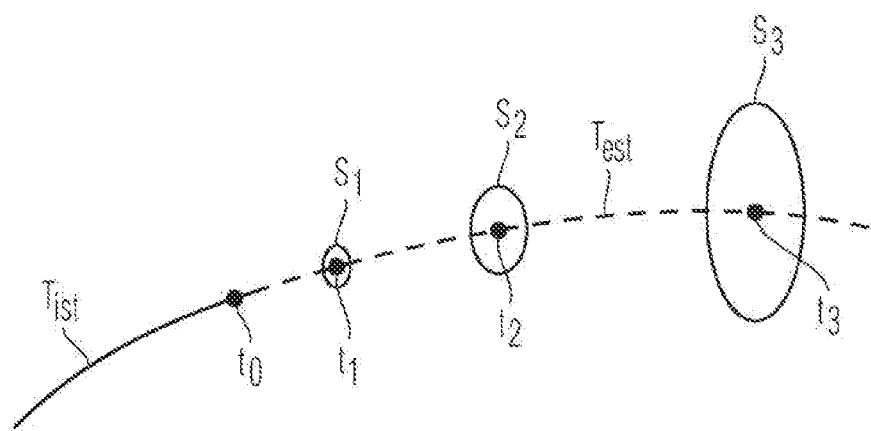
FIG. 3 is a schematic diagram illustrating the method according to an exemplary embodiment of the invention.

The above considerations will now be illustrated with reference to FIGS. 2 and 3. For example, FIG. 2 shows how at time t0 at position $P_0(x_0, y_0, z_0)$, an obstacle H moves into the line of sight between optical assembly 10 and the retroreflector, which has moved along actual trajectory $T_{ist}$ until this point in time. Accordingly, from time t0 on, it is no longer possible to generate a tracking control signal with the aid of the position signals from the detector; i.e., measurement light beam $L_M$ can no longer be steered to follow the retroreflector; the retroreflector has been lost. Then, an estimated trajectory $T_{est}$ of the retroreflector (shown by a broken line in FIG. 2) is determined by the trajectory estimation unit in the manner described above. As illustrated in the figure, the actual trajectory $T_{ist}$ of the retroreflector increasingly deviates from the estimated trajectory $T_{est}$ over time. When, at time $t_1$, the line of sight between optical assembly 10 and the retroreflector becomes clear again, the deviation of the estimated trajectory $T_{est}$ from the actual trajectory $T_{ist}$ may already be significant, and more particularly greater than the so-called "capture zone FB" of the inventive device; i.e., of the position-sensitive detector. In FIG. 2, the capture zone FB at time $t_i$ is indicated by the circular disk-shaped region around measurement light beam $L_M'$ and describes the area within which a deviation of the retroreflector's position from the actual trajectory $T_{ist}$ or the estimated trajectory $T_{est}$ can be corrected and the retroreflector can still be tracked by the measurement light beam $L_M'$ based on the tracking control signals that can be generated with the aid of the detector. Accordingly, at time $t_1$, the retroreflector is at position $P_1^{actual}$ on actual trajectory $T_{ist}$ and not at the estimated position $P_1^{est}$ on the estimated trajectory $T_{est}$. Thus, if in the example of FIG. 2, measurement light beam $L_M'$ precisely followed the estimated trajectory $T_{est}$ in the search mode, then the lost retroreflector could not be reliably retrieved in the event of a prolonged interruption of the beam.

Therefore, an embodiment of the present invention provides that in the search mode, the measurement light beam be moved in a certain spatial search area around the estimated trajectory of the retroreflector. The respective search area should be selected such that the probability of retrieval is as high as possible. In addition, it is preferably provided that the respective search area be increased as the search proceeds. This increases the probability of quickly retrieving the retroreflector and being able to resume the measurement mode. The respective procedure is illustrated in a highly schematic manner in FIG. 3. Again, the retroreflector is lost at time to, until which it has moved along the estimated trajectory $T_{ist}$. By means of the trajectory estimation, the estimated trajectory $T_{est}$ is determined for the subsequent search for the retroreflector. The figure further shows a spatial search area $S_1$, $S_2$, $S_3$ in the form of an uncertainty ellipse for each of subsequent times $t_1$, $t_2$, $t_3$ during the search. As can be seen, search area $S_1$, $S_2$, $S_3$ is increased as the search proceeds; i.e., the search area $S_2$ at time $t_2$; i.e., the respective uncertainty ellipse, is greater than the search area $S_1$ at the previous time $t_1$, etc. The reason for this is that, at or after the time to of reflector loss, the movement of the retroreflector may be subject to a change in speed, acceleration, or jerk. A uniformly continued estimation of the trajectory would not capture these changes, and would thus not reflect the actual trajectory.

A possible procedure for trajectory estimation in the event of a retroreflector loss will be outlined below. After a corresponding status determination, the previous actual trajectory of the retroreflector is extrapolated into an estimated trajectory by means of the trajectory estimation. The trajectory estimation is based at least on the measurement values MS of the angle-measuring devices of the tracking actuator mechanism, which measure rotations about the axes of rotation; i.e., on the respective measured angle values. Moreover, it is also possible to additionally use information from the period of time preceding the beam interruption for trajectory estimation. Examples of such information include determined distances to the retroreflector, speed, acceleration and jerk information in the axes of rotation and in the measured length, etc.

Preferably, in an embodiment of the present invention, the trajectory estimation or the extrapolation of the actual trajectory is performed with the aid of a so-called Kalman filter. A Kalman filter is an iterative state estimator, which can be used to estimate the position, location, speed, and acceleration of the retroreflector. The respective estimation of the position, speed, and acceleration is performed continuously based on the measurement values generated by the angle-measuring devices during the measurement mode of the device according to an embodiment of the invention. If then a beam interruption and, thus, a loss of the retroreflector occurs at a certain point in time, then the estimates of position $\hat{\psi}$, speed $\hat{\dot{\psi}}$ and acceleration $\hat{\ddot{\psi}}$ available and valid at this point in time yield the extrapolation $$\psi(\tau) = \hat{\psi} + \hat{\dot{\psi}} \cdot \tau + \frac{1}{2}\hat{\ddot{\psi}} \cdot \tau^2 \quad \text{(equation 1)}$$

In equation 1, $\tau$ represents the time elapsed since the occurrence of the beam interruption.

The following illustrates, by way of example, the possible design of a Kalman filter for the axis of rotation or azimuth axis, which estimates the azimuth angle, the azimuth angular velocity, and the azimuth angular acceleration based on measurements of an angle-measuring device.

This Kalman filter estimates a state vector, which is selected as follows:

$$\begin{bmatrix} \psi \\ \dot{\psi} \\ \ddot{\psi} \end{bmatrix}$$

where:
$\psi$:=azimuth angle
$\dot{\psi}$:=azimuth angular velocity
$\ddot{\psi}$:=azimuth angular acceleration.

The process dynamics of the Kalman filter; i.e., the time response of the state vector can then be modeled as follows:

$$\frac{d}{dt}\begin{bmatrix} \psi \\ \dot{\psi} \\ \ddot{\psi} \end{bmatrix} = \begin{bmatrix} 0 & 1 & 0 \\ 0 & 0 & 1 \\ 0 & 0 & 0 \end{bmatrix}\begin{bmatrix} \psi \\ \dot{\psi} \\ \ddot{\psi} \end{bmatrix} + w \quad \text{(equation 2)}$$

In the model, the measurement equation for the angle-measuring device at the azimuth axis is given by $$y = [1 \ 0 \ 0]\begin{bmatrix} \psi \\ \dot{\psi} \\ \ddot{\psi} \end{bmatrix} + v \quad \text{(equation 3)}$$

In equations 2) and 3), the variables w and v are noise terms.

With regard to the equations resulting from this model, which describe how, for example, the measured angle values generated can be mathematically combined to form estimates of the state vector, reference is made at this point to the relevant literature such as, for example, the textbook entitled "Optimal State Estimation—Kalman, H$_\infty$, and Nonlinear Approaches", by Dan Simon, published by John Wiley & Sons Inc., 2006.

In addition to the state vector or the estimated trajectory, composed of position, speed, acceleration and optionally further estimated variables, the Kalman filter also estimates the uncertainty; i.e., the covariance matrix, of its state estimate. Thus, the Kalman filter also serves to quantify the uncertainty in the trajectory estimation and to thereby indicate the expected deviations of the trajectory estimate from the true position of the retroreflector. In particular, the Kalman filter may also be used to quantify the variation with time of these uncertainties. Thus, it is possible to indicate, at any point in time, an area around the estimated position of the retroreflector in which the retroreflector is very likely to be located. In FIG. 3, as explained earlier, the uncertainty areas are shown in the form of three uncertainty ellipses around the estimated trajectory $T_{est}$ at the three times $t_1$, $t_2$ and $t_3$. In the search mode, the corresponding uncertainty areas function as spatial search areas $S_i$ (i=1, 2, ...) in which the lost retroreflector is searched for along the estimated trajectory $T_{est}$. Thus, the Kalman filter is also used for determining the search areas $S_i$ (i=1, 2, ...) during the search mode.

The trajectory estimated by the Kalman filter and the thereby determined, time-dependent uncertainties thus form the basis for the steering of the measurement light beam in the search mode, from an interruption of the beam until the retrieval of the retroreflector. In this context, the scanning of a defined spatial search area along the estimated trajectory, which is performed in the search mode, is dependent on the uncertainty estimated by the Kalman filter; i.e., on the uncertainty ellipse effective at the respective point in time.

With reference to FIGS. 4a-7, there will now be described several examples which illustrate how the measurement light beam may be moved in space in a suitable way within the spatial search areas during a beam interruption.

As explained, as soon as the target is detected to be lost, and thus a beam interruption is detected, the emitted measurement light beam is to be moved in search mode by the tracking actuator mechanism, and thus by suitable rotational movements about the azimuth and elevation axes, along a search pattern in a spatial search area along the estimated trajectory on a search path. The purpose of following this search path is that, after the line of sight is cleared, the measurement light beam should retrieve the retroreflector as quickly as possible so that tracking can be performed again in the manner described at the outset.

The search patterns generated by the search pattern generation unit and described below by way of example merely represent the deviation of the search path of the measurement light beam from the estimated trajectory within the respective spatial search area. The ultimately resulting overall movement of the measurement light beam or the search path is obtained by the superimposition of the estimated trajectory and the search patterns described below.

Figure 4A:
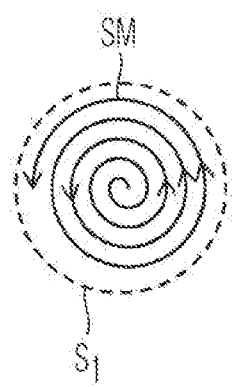
FIGS. 4a-4c are diagrams showing a first example of a search pattern during the retroreflector search.
Figure 4B:
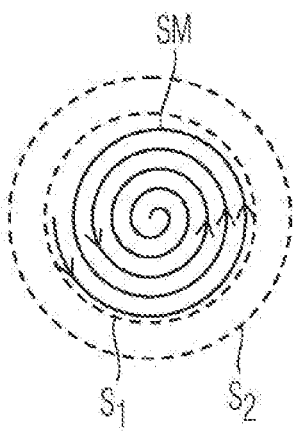
Figure 4C:
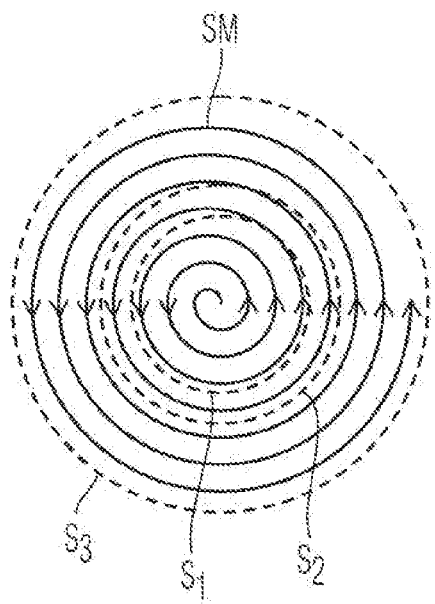

A first option will be described with the aid of FIGS. 4a-4c and 5. FIGS. 4a-4c and 5 each show a search pattern SM at different times $t_1 < t_2 < t_3$ during the search mode. Analogously to the example shown in FIG. 3, it is provided that the search area $S_i$ (i=1, 2, 3) be increased over time. That is, the uncertainty ellipse corresponding to search area $S_2$ at time $t_2$ is greater than the uncertainty ellipse or the search area $S_1$ at time $t_1$. Finally, the search area $S_3$ at the later time $t_3$ is even greater than search area $S_2$. The respective search pattern SM is here spiral-shaped; i.e., the measurement light beam moves on a spiral path repeatedly from a center of search area $S_i$ (i=1, 2, 3) to a boundary of search area $S_i$ (i=1, 3, . . . ) and back again. In the specific example shown, the measurement light beam according to FIG. 4a first moves from the center spirally outward until, at time $t_1$, it reaches the boundary of the search area $S_1$ effective at this point in time. The direction of movement then reverses from a radially outward direction to a radially inward direction, and search pattern SM is then traversed in the opposite direction to the center which, according to FIG. 4b, is reached at time $t_2$. As can be seen from FIG. 4b, at time $t_2$, there exists an increased search area $S_2$ and a correspondingly larger uncertainty ellipse. The measurement light beam then moves along search pattern SM spirally outward again until time $t_3$, at which, according to FIG. 4c, it reaches the boundary of the search area $S_3$ that is effective at this point in time and where the direction of movement changes again, etc. Accordingly, in this example, it is provided that the measurement light beam be repeatedly moved along a spiral search pattern SM from a center of search area $S_i$ (i=1, 3, . . . ) to a boundary of search area $S_i$ (i=1, 3, . . . ) and back again.

Figure 5:
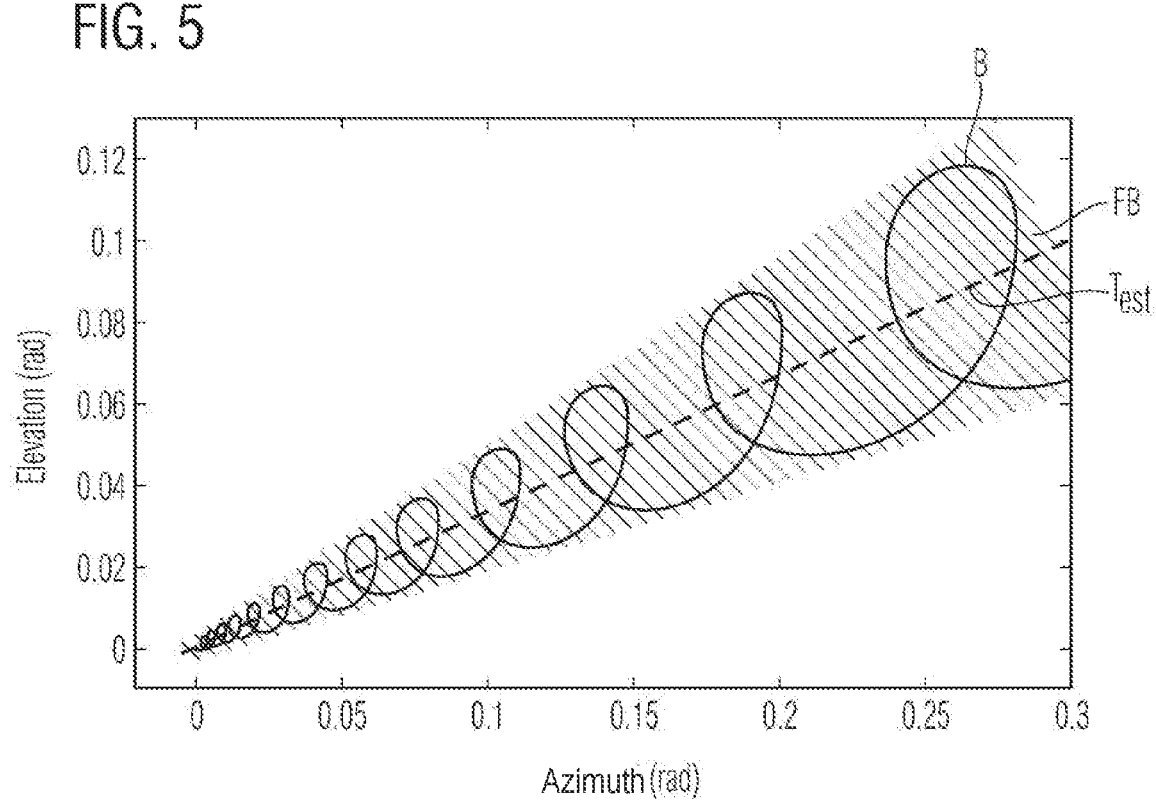
FIG. 5 is a diagram of the path of the measurement light beam, resulting from the superimposition of the search pattern of FIGS. 4a-4c and an estimated trajectory of the retroreflector.
Figure 6A:
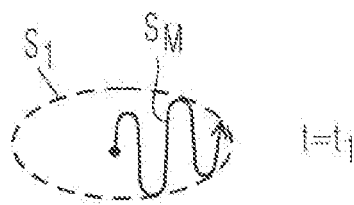
FIGS. 6a-6d are diagrams showing a second example of a search pattern during the retroreflector search.
Figure 6B:
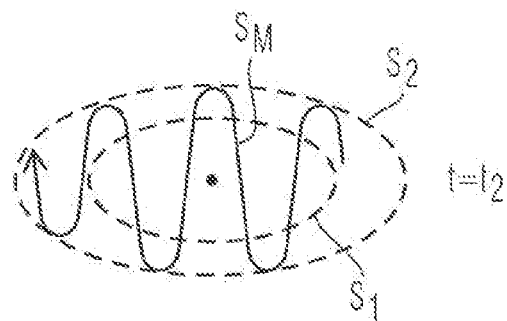
Figure 6C:
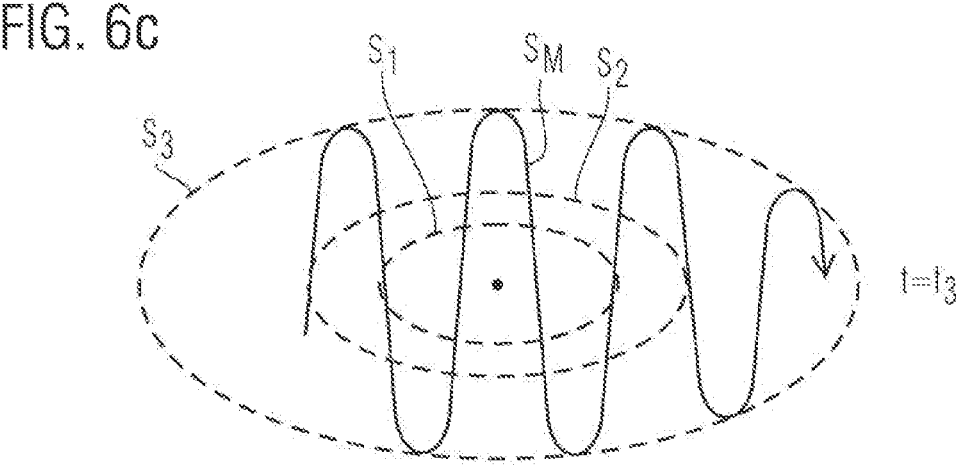
Figure 6D:
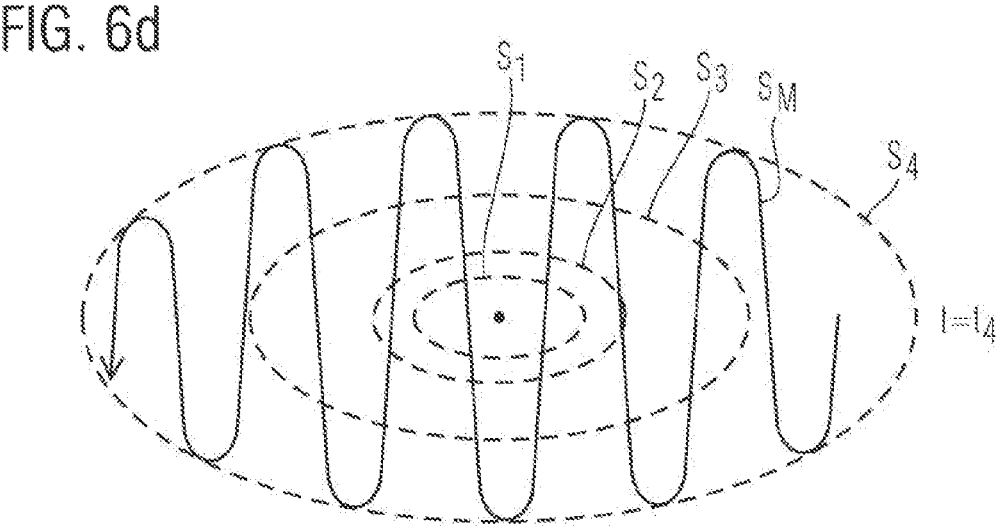

FIG. 5 shows the superimposed movement or search path of the measurement light beam resulting from the estimated trajectory $T_{est}$ and the spiral search pattern SM in the search mode. The figure also shows the estimated trajectory $T_{est}$ in a broken line. The figure clearly illustrates how the resulting search path B of the measurement light beam increasingly deviates from the estimated trajectory $T_{est}$ in the search mode over time; i.e., how the spatial search area $S_i$ (i=1, 2, . . . ) around the estimated trajectory $T_{est}$ increases over time. Also shown in FIG. 5 is the capture zone FB around search path B, which ultimately indicates the area that is scanned for the lost retroreflector with the aid of such a search path B.

Another example of a suitable search pattern SM will be explained with reference to FIGS. 6a-6d. Analogously to the previous example, there is shown the respective search area $S_1$-$S_4$ or the respective uncertainty ellipse at different times $t_1 < t_2 < t_3 < t_4$ during the search mode. The search pattern SM within search areas $S_1$-$S_4$ is here serpentine-shaped; the measurement light beam moves within search areas $S_1$-$S_4$ along a, here horizontal, direction between the, here left and right, boundaries of search areas $S_1$-$S_4$. As can be seen from the figures, the boundaries of search areas $S_1$-$S_4$ form an envelope for the serpentine-shaped search pattern SM. Resulting is an oscillatory movement of the measurement light beam along the vertical direction in the figures, while the movement in the horizontal direction perpendicular thereto in almost uniform. The reversal points in search pattern SM result from the boundaries of search areas $S_1$-$S_4$, which change over time. Accordingly, in this example, it is provided that the measurement light beam be moved back and forth between opposite boundaries of the search area $S_i$, (i=1, 2, . . . ) along a serpentine search pattern SM in an oscillating manner about a predetermined direction.

Figure 7:
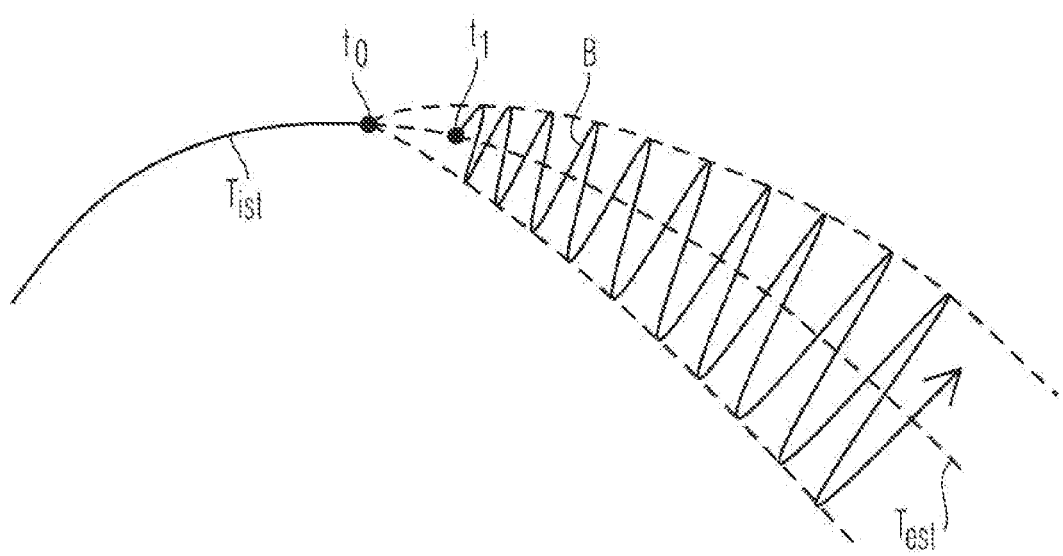
FIG. 7 is a schematic diagram illustrating another variant for the search of the retroreflector.

FIG. 7 finally shows a third option for a suitable procedure in the search mode according to an embodiment of the present invention when the target was lost. Analogously to FIG. 5, this figure shows the search path B of the measurement light beam during the search mode, which search path B results from the superimposition of a search pattern and the estimated trajectory $T_{est}$.

Until the time to at which the beam is interrupted, the retroreflector moves along actual trajectory $T_{ist}$. Once the retroreflector is detected to be lost as explained above, the measurement light beam is initially moved for a predetermined period from time $t_0$ to time $t_1$ at a first speed along the estimated trajectory $T_{est}$. This is intended to ensure that the searching measurement light beam is located behind the actual position of the lost retroreflector. The speed at which the measurement light beam is intended to move during this period of time is selected to be significantly lower than the speed of movement of the measurement light beam in the preceding measurement mode. The duration of this movement of the measurement light beam is selected to be on the order of the estimated duration of the beam interruption. From time $t_1$ on, the speed of movement of the measurement light beam along the estimated trajectory $T_{est}$ is significantly increased to a second speed. From time $t_1$ on, the measurement light beam is at the same time moved in an oscillating manner about the estimated trajectory $T_{est}$. During this process, as can be seen from the figure, the oscillation amplitude increases as the search proceeds. Thus, here too, provision is made for the spatial search area around the estimated trajectory $T_{est}$, to increase in the search mode.

During the search mode, the signal-processing unit continuously checks whether the retroreflector is in the capture zone and whether a tracking control signal can thus be generated based on a measurement light beam that has been detected on the position-sensitive detector again. Once this is possible, the steering of the beam is no longer performed based on the tracking control signal generated by means of the trajectory estimation, but with the aid of the tracking control signal that is generated, as explained above, from the position of the measurement light beam on the position-sensitive detector.

In the following, relevant steps of the method will finally be described in summary with reference to the flow chart in FIG. 8.

In step S10, tracking of the retroreflector by the measurement light beam still takes place in an undisturbed manner in the measurement mode. A portion of the measurement light beam reflected back from the retroreflector falls on the position-sensitive detector, and the signal-processing unit generates the tracking control signals for the tracking actuator mechanism based on position signals of the detector. The tracking actuator mechanism then steers the measurement light beam to follow the retroreflector, which is movable in space.

In accordance with step S20, it is continuously checked by means of the status determination whether the retroreflector can be tracked using the respective tracking control signals that are generated from the position signals of the position-sensitive detector, or whether the retroreflector may have been lost, for example due to a prolonged beam interruption in the measurement light beam. As explained earlier, this may be done, for example, by comparing the intensity measured by the detector to a suitable intensity threshold.

If a corresponding loss of the retroreflector is detected, then, in accordance with step S30, an estimated trajectory of the retroreflector is generated with the aid of the trajectory estimation unit for future points in time $t_i$ (i=1, 2, . . . ) from measurement values of the tracking actuator mechanism.

Further, in accordance with step S40, the signal-processing unit determines uncertainty areas or search areas around the estimated trajectory for future points in time $t_i$ (i=1, 2, . . . ).

Finally, in step S50, the search pattern generation unit generates a suitable search pattern, adapted to the estimated trajectory and the determined search area.

The measurement light beam is then moved along a corresponding search path with the aid of the tracking actuator mechanism using the tracking control signals derived from the determined search pattern and the estimated trajectory (step S60).

During the search mode, it is continuously checked in accordance with step S70 whether a tracking control signal can be generated via the position-sensitive detector again; i.e., whether the retroreflector is in the capture zone again. If this is the case, the search mode is terminated and the tracking of the retroreflector, and thus the normal measurement mode, may be resumed in accordance with step S10. Otherwise, the measurement light beam is moved further along the determined search path in the search mode in accordance with step S60.

In addition to the described exemplary embodiments and variants of the device and method according to embodiments of the invention, other embodiments are, of course, possible.

For example, as mentioned earlier above, alternative distance measurement methods could be used in place of the described interferometric method.

Moreover, there are also alternative ways of estimating the trajectory of the measurement light beam for the search mode. For example, trajectory extrapolation with the aid of a so-called polynomial fit could be used instead of a Kalman filter.

Furthermore, the light source in the form of a semiconductor laser or laser diode could also be disposed in the optical assembly.

While subject matter of the present disclosure has been illustrated and described in detail in the drawings and foregoing description, such illustration and description are to be considered illustrative or exemplary and not restrictive.

Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for tracking a retroreflector that is movable in space, the method comprising:
   emitting, by a light source, a measurement light beam toward the retroreflector, which reflects the measurement light beam back in a direction opposite to an incident direction, wherein at least a portion of the measurement light beam that was reflected is incident at a position on a position-sensitive detector;
   generating, by a signal processor, a tracking control signal as a function of the position of the measurement light beam on the position-sensitive detector, the tracking control signal being used by a tracking actuator mechanism to steer the measurement light beam to follow the retroreflector;
   continuously making a status determination, by the signal processor, as to whether the measurement light beam is steerable by the tracking actuator mechanism to follow the retroreflector or whether the retroreflector has been lost; and
   performing, in a search mode based on it having been determined that the retroreflector has been lost, a trajectory estimation based on measurement values from the tracking actuator mechanism in order to determine an estimated trajectory of the retroreflector for future points in time, wherein search areas around the estimated trajectory are determined for the future points in time, wherein a search pattern adapted to the estimated trajectory and the determined search areas is created, wherein the measurement light beam is then moved along a corresponding search path with aid of the tracking actuator mechanism using tracking control signals derived from the estimated trajectory and the created search pattern, and
   wherein the search mode is terminated upon a tracking control signal being generatable by the position-sensitive detector again,
   wherein the measurement light beam is repeatedly moved along a spiral search pattern from a center of the search areas to a boundary of the search areas and back again.

2. The method as recited in claim 1, wherein a spatial extent of the search areas around the estimated trajectory of the retroreflector is increased as the search mode proceeds.

3. The method as recited in claim 1, wherein the trajectory estimation is performed with aid of a Kalman filter which extrapolates an actual trajectory traveled until the retroreflector was lost.

4. A method for tracking a retroreflector that is movable in space, the method comprising:

emitting, by a light source, a measurement light beam toward the retroreflector, which reflects the measurement light beam back in a direction opposite to an incident direction, wherein at least a portion of the measurement light beam that was reflected is incident at a position on a position-sensitive detector;

generating, by a signal processor, a tracking control signal as a function of the position of the measurement light beam on the position-sensitive detector, the tracking control signal being used by a tracking actuator mechanism to steer the measurement light beam to follow the retroreflector;

continuously making a status determination, by the signal processor, as to whether the measurement light beam is steerable by the tracking actuator mechanism to follow the retroreflector or whether the retroreflector has been lost; and performing, in a search mode based on it having been determined that the retroreflector has been lost, a trajectory estimation based on measurement values from the tracking actuator mechanism in order to determine an estimated trajectory of the retroreflector for future points in time, wherein search areas around the estimated trajectory are determined for the future points in time, wherein a search pattern adapted to the estimated trajectory and the determined search areas is created, wherein the measurement light beam is then moved along a corresponding search path with aid of the tracking actuator mechanism using tracking control signals derived from the estimated trajectory and the created search pattern, and wherein the search mode is terminated upon a tracking control signal being generatable by the position-sensitive detector again, wherein the measurement light beam is initially moved for a predetermined period of time at a first speed along the estimated trajectory of the retroreflector, and after the predetermined period of time has elapsed, the measurement light beam is moved in an oscillating manner about the estimated trajectory at a second speed that is greater than the first speed, an oscillation amplitude increasing as the search mode proceeds.

5. The method as recited in claim 4, wherein a spatial extent of the search areas around the estimated trajectory of the retroreflector is increased as the search mode proceeds.

6. The method as recited in claim 4, wherein the measurement light beam is repeatedly moved along a spiral search pattern from a center of the search areas to a boundary of the search areas and back again.

7. The method as recited in claim 4, wherein the measurement light beam is moved back and forth between opposite boundaries of the search areas along a serpentine search pattern in an oscillating manner about a predetermined direction.

8. A device for tracking a retroreflector that is movable in space, the device comprising:

a light source configured to emit a measurement light beam toward the retroreflector, which reflects the measurement light beam back in a direction opposite to an incident direction;

a position-sensitive detector arranged such that at least a portion of the retro-reflected measurement light beam that has been reflected is incident at a position on the position-sensitive detector; and a signal processor configured to:

generate a tracking control signal as a function of the position of the measurement light beam on the detector, the tracking control signal being usable by a tracking actuator mechanism to steer the measurement light beam to follow the retroreflector, continuously make a status determination as to whether the measurement light beam is steerable by the tracking actuator mechanism to follow the retroreflector or whether the retroreflector has been lost, perform, in a search mode based on it having been determined that the retroreflector has been lost, a trajectory estimation based on measurement values from the tracking actuator mechanism in order to determine an estimated trajectory of the retroreflector for future points in time, and determine search areas around the estimated trajectory for the future points in time, and create a search pattern adapted to the estimated trajectory and the determined search areas, and move, after creating the search pattern, the measurement light beam along a corresponding search path with aid of the tracking actuator mechanism using tracking control signals derived from the estimated trajectory and the created search pattern, and wherein the device is configured to terminate the search mode upon a tracking control signal being generatable by the position-sensitive detector again, and wherein the measurement light beam is initially moved for a predetermined period of time at a first speed along the estimated trajectory of the retroreflector, and after the predetermined period of time has elapsed, the measurement light beam is moved in an oscillating manner about the estimated trajectory at a second speed that is greater than the first speed, an oscillation amplitude increasing as the search mode proceeds.

9. The device as recited in claim 8, wherein the signal processor is configured to increase a spatial extent of the search areas around the estimated trajectory as the search mode proceeds.

10. The device as recited in claim 8, wherein the tracking actuator mechanism includes two drives which enable rotation of the measurement light beam about two orthogonal axes of rotation, each axis of rotation being associated with an angle-measuring device whose measured angle values are used by the signal processor for the trajectory estimation.

11. The device as recited in claim 8, further comprising an optical assembly including at least two beam splitters, a reference reflector, a distance-measurement detection unit and the position-sensitive detector, the optical assembly being capable of receiving a light beam emitted by the light source, so that:

in the optical assembly, the received light beam strikes a first beam splitter, which splits the light beam incident thereon into the measurement light beam and a reference light beam, the measurement light beam propagates toward the retroreflector, and the reference light beam propagates toward the reference reflector, the reference light beam reflected back from the reference reflector strikes the first beam splitter again, the measurement light beam reflected back from the retroreflector strikes a second beam splitter via which a portion of the measurement light beam is coupled out to the position-sensitive detector and a remaining portion of the measurement light beam that has been reflected strikes the first beam splitter again, where the measurement light beam is superimposed on the reference light beam, and the superimposed measurement and reference light beam propagates toward the distance-measurement detection unit.

* * * * *